Dec. 5, 1933.   G. R. APPELBERG ET AL   1,938,310
SPINDLE DRIVE FOR MACHINE TOOLS
Filed April 20, 1932   2 Sheets-Sheet 1

INVENTORS.
GUSTAF R. APPELBERG
DUDLEY B. BULLARD
BY
ATTORNEY

INVENTORS.
GUSTAF R. APPELBERG
DUDLEY B. BULLARD

Patented Dec. 5, 1933

1,938,310

UNITED STATES PATENT OFFICE 1,938,310

SPINDLE DRIVE FOR MACHINE TOOLS

Gustaf Robert Appelberg, Bridgeport, and Dudley B. Bullard, Southport, Conn., assignors to The Bullard Company, a corporation of Connecticut Application April 20, 1932. Serial No. 606,328

14 Claims. (Cl. 29—38)

It is among the primary objects of the present invention to provide a spindle drive construction which will be highly efficient by virtue of its ability to partake of the advantages inherent in that form of drive commonly referred to, in automotive circles, as "free wheeling".

Another object is to provide a mechanism in which the normal spindle and drive gear union may be divorced so as to permit the control of either one independently of the other to the end that such control may function with a minimum consumption of energy.

Another object is to provide an assembly which lends itself to automaticity which quality is particularly adaptable to multi-spindle machine tools. Thus, the high efficiency and the ability of independent spindle and driving gear control may be provided in wholly automatic machines which have heretofore labored under such handicaps as the necessity of breaking down valuable spindle inertias in the interest of avoiding gear clashings, etcetera.

While the invention embraces numerous further objects, some of which relates to structural features, it should be noted that the invention provides three main features of merit in addition to the conventional drive common to all such assemblies, i. e.

1. The ability of stopping the spindle drive gear while permitting the spindle to turn freely under the influence of inertia.

2. The ability of stopping the spindle to accommodate loading and unloading.

3. The ability of automatic selective control of the operation of these two features.

While the invention is broadly applicable to both single and multiple spindle machine tools, it is believed that the structure of the present illustrative embodiment, as well as the great importance of the invention in the art, may be better appreciated from a consideration of its advantages in multi-spindle machines of either the boring, turning or drilling type. In such machines, the spindles, usually work spindles, are commonly indexed from one operating position to another. This frequently requires a disengagement of the spindle driving gear from its driver and the subsequent engagement thereof with another driver. In the reengagement of the spindle gear it is necessary, or at least advisable, particularly for the avoidance of gear clashing, to have the gear stationary with respect to rotation on its own axis. Common practice has, therefore, been to brake, by friction means, the spindle rotation, it being understood that in all cases the spindle gear has been secured for rotation with the spindle. Such stopping of the spindle did, of course, dissipate and waste inertia energy and required energy from the next driving member to bring the spindle back to rotation at the desired speed. When working at high speeds and/or with heavy work, it will be seen that such energy waste would be tremendous, especially when computed with a view to starting torque requirements. From this consideration of the subject, it will be seen that the ability of the spindle to "overrun" its drive gear or "free wheel" as provided by this invention is an important advance in machine tool efficiency.

While the inventive concept is susceptible to a wide variety of executions and while it is obvious that various mechanical constructions may be arranged for carrying out the principle taught, it will be seen from a consideration of the drawings and specification that that form of the invention here shown by way of illustration, is of refreshing simplicity. The spindle drive gear is mounted upon the spindle through the medium of an overrunning clutch assembly which in this preferred embodiment includes a double acting brake applicable independently to retard and/or stop either the gear or the spindle. An automatically actuated brake arm may be included for automatically actuating the brake in either direction.

In the drawings

Figure 1:
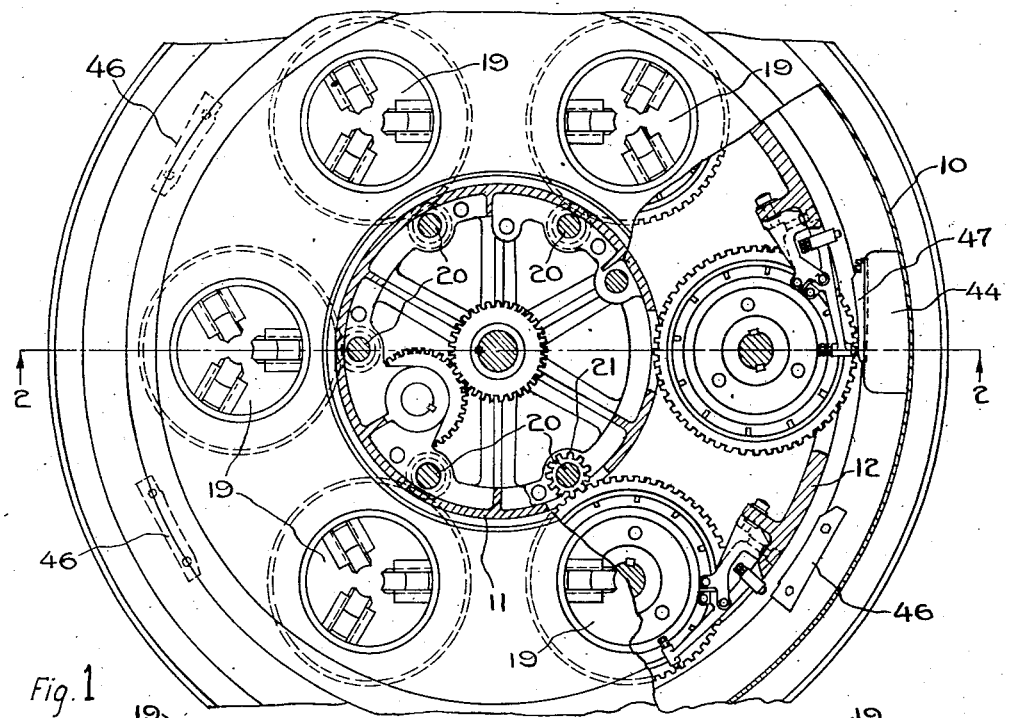
Fig. 1 is a horizontal section illustrating the application of the invention to a conventional multi-spindle machine tool.
Figure 2:
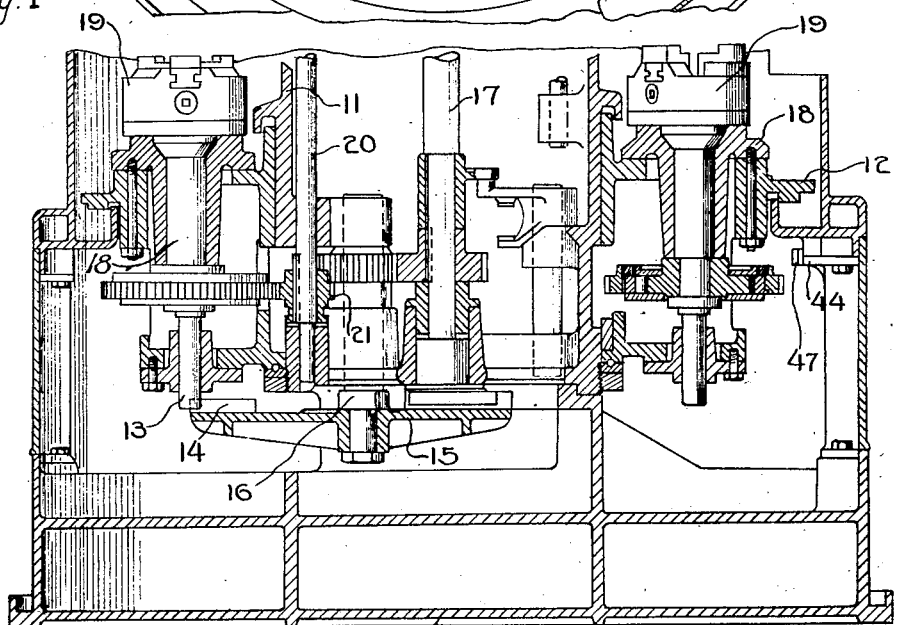
Fig. 2 is a vertical section taken on the line 2—2 of Fig. 1.

By way of illustration, the invention is shown in Figs. 1 and 2 as applied to a Mult-Au-Matic type of lathe such as disclosed in Patent No. 1,360,175. Such illustration is, however, not deemed to indicate a restriction of the invention to such machines. By reference to the drawings and, if need be, to the patent mentioned, those skilled in the art will appreciate that the machine includes tools, tool feeding mechanisms, driving trains and control mechanism not here-in disclosed. Suffice it, therefore, to point out that the structure selected to present most clearly one of the many applications of the invention includes a generally circular stationary base 10 upon which is mounted an upstanding stationary central column 11 which houses and supports the tools and feed and control works, not shown. Encircling the column 11 and supported from the base 10 there is a spindle carrier or table 12 adapted to be periodically indexed (in the instant case one sixth of a revolution) by the engagement of a spindle end 13 thereof with the end 14 of an oscillating arm 15 which is shown as actuated by the crank 16 operated by the periodically acting shaft 17.

As indicated, the carrier 12 may mount six or any other desired number of spindles 18, each of which support a work holding chuck 19. During the periods of rest, all but one (in this case 5) of the spindles and chucks are aligned with an equal number of tools (not shown), the tools being carried by the column and the super-structure of the machine. The four spindles and chucks indicated by the dotted lines in Fig. 1 as well as the one partly in section are at the work stations while the spindle shown in section is at a station which has no tool. This arrangement provides a work removing and loading station where the operator may load and remove work while operations are being performed at the work stations.

At the loading station, no means for driving the spindle gear is provided, while adjacent each other station a shaft 20 (driven by a suitable source of power not shown) is mounted which carries a driving gear 21 with which a spindle gear meshes at the end of each indexing movement. While it is feasible for the spindle gear to move out from its engagement with its gear 21 under the influence of the indexing movement, it is not practical to attempt a reenmeshment of gears by this means. This maintains regardless of whether the spindle gear is revolving or not. Thus, to overcome this difficulty it is the practice in this type of machine to raise the gears 21 on the shafts 20 towards the end of the indexing movement so that they are out of the way of the spindle gears as they approach the working stations. This permits the subsequent axial movement of the gears 21 which permits their endwise enmeshing movement. By the present invention, the spindle gears are held against rotation at the enmeshing period and in such a manner as to permit the free turning of the spindle in the interim.

Figure 3:
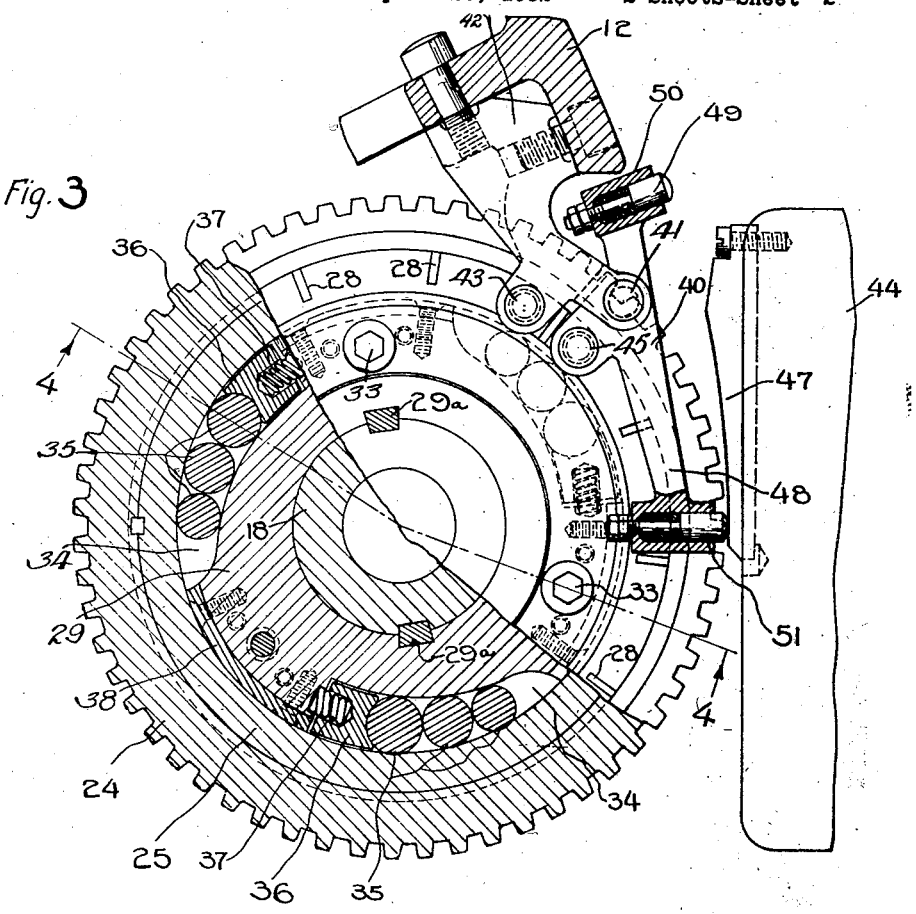
Fig. 3 is a top plan view of the assembly partly broken away.
Figure 4:
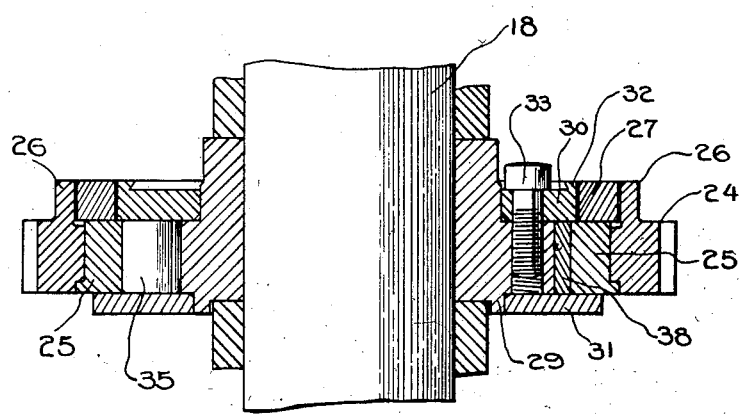
Fig. 4 is a section taken on the line 4—4 of Fig. 3.

With specific reference to Figs. 3 and 4 it will be seen that the spindle drive means includes the spindle drive gear 24 which is a toothed ring keyed to a supporting ring 25 and provided with an upstanding flange 26 the inner surface of which is the friction brake surface for the external surface of a brake band 27 which is cut as at 28 to permit its flexing under the influence of its operator.

The gear 24 and its ring 25 are supported to surround a clutch hub 29 which is keyed to the spindle 18 as at 29a. Upper and lower plates, 30 and 31 respectively, embrace the sides of the ring 25 to maintain its alignment. The upper plate 30 has an external flange 32, the outer face of which acts as the friction braking surface for the spindle, it being adapted to be engaged by the inner face of the brake band 27 and being secured to the hub by the bolts 33.

The outer surface of the plate is cut away to form tapered pockets 34 which seat one or more clutch rollers 35 which are urged by a plunger 36 forced by spring 37 towards the narrow end of the pocket. To insure perfect fit between ring 25 and plate 29, the outer surface of the intervening material of the plate is provided with wear plates 38. This structure constitutes an overrunning drive clutch, the mode of operation of which is common. When the gear 24 and its ring 25 are driven, the inner surface of the ring 25 engages the rollers 35 which tend to roll to the restricted end of the pocket. They are thus forced outwardly towards the ring and the contact constitutes a positive drive between ring and spindle. However, when the spindle is turning faster than the ring and gear as when the ring and gear are not driven, the friction between ring and rollers tends to move the rollers in the opposite direction or back into the wide portion of the pocket against the tension of the spring and plunger thus braking the driving connection and permitting the free rotation of the spindle independent of the ring and gear.

From a cosideration of this structure, it will be noted that by moving the ends of the brake band apart, the band will be expanded to frictionally engage the flange 26 and arrest the rotation of the gear 24 while contraction of the band will cause its inner surface to engage the face 32 of plate 31 thus acting to brake the rotation of the spindle 18. For affecting these movements of the brake band, a double ended brake operating arm 40 is provided which is fulcrumed at 41 in a bracket 42 mounted on the carrier 12 and thus fixed with respect to the spindle axis. The bracket 42 carries also a projection 43 engaging one end of the brake band 27 while the other end is engaged by the projection 45 of the arm 40. Thus, as the arm 40 is moved, the projection 45 moves with respect to the projection 43 to expand or contract the band and thus to brake the gear or spindle respectively.

For automatically actuating the arms 40 in accordance with the indexing of the table, cam plates 46 and 47 are carried by an inward flange 44 of the base 10. One cam plate 46 is positioned just in advance of each work station, while one cam plate 47 is arranged at the loading station. As the table indexes to the right or clockwise as seen in Fig. 1, the arm 40 of each drive mechanism which is approaching a working station has its forward end 48 pass freely over the cam 46 while the spring pressed plunger 49 of its further extending rearward end 50 strikes the cam and causes the arm to rock in a counter clockwise direction from Fig. 3. This action spreads the ends of the band 27, thus causing it to bind against the flange of the gear 24 and while the overrunning clutch permits the inertia of the spindle to continue its rotation, the gear 24 is stopped so as to facilitate its enmeshment with the driving gear 21.

At the loading station it is required that the spindle be stopped so as to permit unloading, loading and chucking and at this station the cam 47 is provided which extends further into the path of the arm 40 so as to be engaged by the spring pin 51 of the forward end 48 of the arm 40. This provides for the reverse operation of the brake. The clockwise rocking of the arm contracts the band 27 so that it engages the flange 32 of the hub 29 carried by the spindle and this brings the spindle to a standstill so as to accommodate loading and unloading. Obviously, since there is no driving means for the gear at this point, it will stop with the braking of the spindle rotation.

From the foregoing it will be seen that the invention provides for energy saving in machine tool operation and at the same time provides a novel, simple and efficient mechanism for automatically and selectively controlling the spindle and the spindle drive gear. It will be understood that numerous changes, modifications and the full use of equivalents may be resorted to in the practice of the invention without departing from the spirit or scope of the appended claims.

Having thus set forth the nature of our invention, what we claim is:

1. In a machine tool, the combination of a spindle, driving means therefor, and an overrunning clutch between said spindle and said means and means for braking the rotation of either said spindle or said means.

2. In a machine tool, the combination of a spindle, driving means therefor, and an overrunning clutch between said spindle and said means and a single brake operable selectively to control either said spindle or said means.

3. A machine tool spindle including a spindle shaft, an overrunning clutch on said shaft and a spindle gear having driving relation with said spindle through said clutch and a single brake for said spindle and gear.

4. A machine tool spindle including a spindle shaft, an overrunning clutch on said shaft and a spindle gear having driving relation with said spindle through said clutch and brake flanges on said spindle and gear together with a single brake band selectively engageable with either of said flanges.

5. In a machine tool, a spindle, means for driving the spindle, means for braking the drive means, means for braking the spindle and means for permitting the spindle to rotate independent of the drive means.

6. In a machine tool, an indexing table, a plurality of spindles carried by the table, drive gears for said spindles and means to permit said spindles to overrun said drive means, brakes for said spindles controllable by the indexing of said table.

7. In a machine tool, an indexing table, a plurality of spindles carried by the table, drive gears for said spindles and means to permit said spindles to overrun said drive means, brakes for said drive mean controllable by the indexing of said table.

8. In a machine tool, an indexing table, a plurality of spindles carried by the table, drive gears for said spindles and means to permit said spindles to overrun said drive means and means for stopping said spindle.

9. In a machine tool, an indexing table, a plurality of spindles carried by the table, drive gears for said spindles and means to permit said spindles to overrun said drive means and means for stopping said drive gear.

10. In a machine tool, an indexing table, a plurality of spindles carried by the table, drive gears for said spindles and means to permit said spindles to overrun said drive means and a brake operable selectively to arrest said spindle on said gear.

11. In a machine tool, an indexing table, a plurality of spindles carried by the table, drive gears for said spindles and means to permit said spindles to overrun said drive means and a brake operable selectively to arrest said spindle or said gear and means for automatically actuating said brake upon the indexing movement of said table.

12. In a machine tool, the combination of a spindle, a clutch hub mounted on said spindle, a spindle gear encircling said hub, overrunning clutch means between said hub and gear and a brake selectively operable to retard the rotation of either said hub or said gear.

13. In a machine tool, the combination of a spindle, a clutch hub mounted on said spindle, a spindle gear encircling said hub, overrunning clutch means between said hub and gear and a brake selectively operable to retard the rotation of either said hub or said gear, and a pivotal brake operating member rockable either forward or backward to apply said brake to said hub or gear respectively.

14. In a machine, an indexing table, a plurality of spindles carried by the table, clutch hubs on said spindles, driving gears encircling said hubs, overrunning clutch connections between said gears and said hubs, brakes operable to retard the rotation of either said hubs or said gears and means operable upon indexing of the table to retard the rotation of the gears during indexing from one work station to another and for retarding the rotation of the spindle as it approaches a loading station.

GUSTAF ROBERT APPELBERG.
DUDLEY B. BULLARD.